(12) United States Patent
Petrarca

(10) Patent No.: US 11,788,626 B2
(45) Date of Patent: Oct. 17, 2023

(54) DYNAMIC SEAL ROTOR

(71) Applicant: Eaton Intelligent Power Limited, Dublin (IE)

(72) Inventor: Michael Christopher Petrarca, Coventry, RI (US)

(73) Assignee: Eaton Intelligent Power Limited, Dublin (IE)

( * ) Notice: Subject to any disclaimer, the term of this patent is extended or adjusted under 35 U.S.C. 154(b) by 147 days.

(21) Appl. No.: 17/133,098

(22) Filed: Dec. 23, 2020

(65) Prior Publication Data
US 2021/0199196 A1    Jul. 1, 2021

Related U.S. Application Data

(60) Provisional application No. 62/955,187, filed on Dec. 30, 2019.

(51) Int. Cl.
*F16J 15/3252*    (2016.01)

(52) U.S. Cl.
CPC ................. *F16J 15/3252* (2013.01)

(58) Field of Classification Search
CPC ........................... F16J 15/3252; F16J 15/3404
See application file for complete search history.

(56) References Cited

U.S. PATENT DOCUMENTS

| | | | | |
|---|---|---|---|---|
| 2,483,988 A | * | 10/1949 | Victor | F16J 15/3252 277/577 |
| 5,844,338 A | * | 12/1998 | Horski | H02K 11/33 310/90 |
| 6,079,942 A | * | 6/2000 | Weir | F04D 29/128 415/230 |
| 6,409,177 B1 | * | 6/2002 | Johnston | F16J 15/3244 277/560 |
| 6,417,585 B1 | | 7/2002 | Oohashi et al. | |
| 7,692,342 B2 | | 4/2010 | Ahn | |
| 8,729,751 B2 | * | 5/2014 | Telakowski | H02K 1/32 310/64 |
| 9,013,075 B2 | | 4/2015 | Graman | |

(Continued)

FOREIGN PATENT DOCUMENTS

| | | |
|---|---|---|
| CN | 101313453 A | 11/2008 |
| CN | 206299609 U | 7/2017 |

(Continued)

OTHER PUBLICATIONS

Preliminary Search Report and Written Opinion for FR2014162, dated Jun. 3, 2022.

*Primary Examiner* — Eugene G Byrd
(74) *Attorney, Agent, or Firm* — Merchant & Gould P.C.

(57) ABSTRACT

A seal rotor which can include a plurality of fluid inlets on the exterior. The fluid inlets can draw fluid into the body of the seal which can assist in removing heat from the primary sealing interface, thereby reducing thermal deformation of the sealing interface with its non-rotating counterpart. The seal rotor configuration allows fluid to flow through the seal rotor and keep the seal rotor closer to an isothermal state than a prior art seal rotor. The seal's body can additionally include a series of fins on the inside of the body. The fins define channels through which fluid entering via the fluid inlets can flow. These features function as a system for spreading and dissipating the heat of the system.

18 Claims, 10 Drawing Sheets

(56) References Cited

U.S. PATENT DOCUMENTS

| | | | |
|---|---|---|---|
| 9,945,235 B2* | 4/2018 | Berard | F01D 11/003 |
| 2002/0053838 A1* | 5/2002 | Okuda | H02K 11/048 |
| | | | 310/216.014 |
| 2005/0047912 A1 | 3/2005 | Giesler et al. | |
| 2008/0217865 A1* | 9/2008 | Sedlar | F16J 15/3244 |
| | | | 277/572 |
| 2016/0047476 A1* | 2/2016 | Kiernan | F16J 15/342 |
| | | | 277/306 |
| 2016/0265667 A1* | 9/2016 | Khan | F16J 15/3456 |
| 2018/0149271 A1* | 5/2018 | Mountz | F16J 15/164 |
| 2018/0347705 A1* | 12/2018 | Winkelmeyr | F16J 15/3404 |
| 2018/0355757 A1* | 12/2018 | Walker | F16J 15/162 |
| 2019/0058367 A1* | 2/2019 | Mucha | F04D 29/584 |
| 2019/0120385 A1* | 4/2019 | von Engelbrechten | |
| | | | F16J 15/3284 |

FOREIGN PATENT DOCUMENTS

| | | | | |
|---|---|---|---|---|
| DE | 19705409 A1 * | 8/1998 | | F16J 15/3232 |
| DE | 102010061819 A1 * | 5/2012 | | F16J 15/32 |
| EP | 1692412 B1 | 11/2009 | | |
| JP | 2006180617 A | 7/2006 | | |
| WO | 2013106194 A1 | 7/2013 | | |
| WO | 2018114037 A1 | 6/2018 | | |

* cited by examiner

FIG. 5
FIG. 6
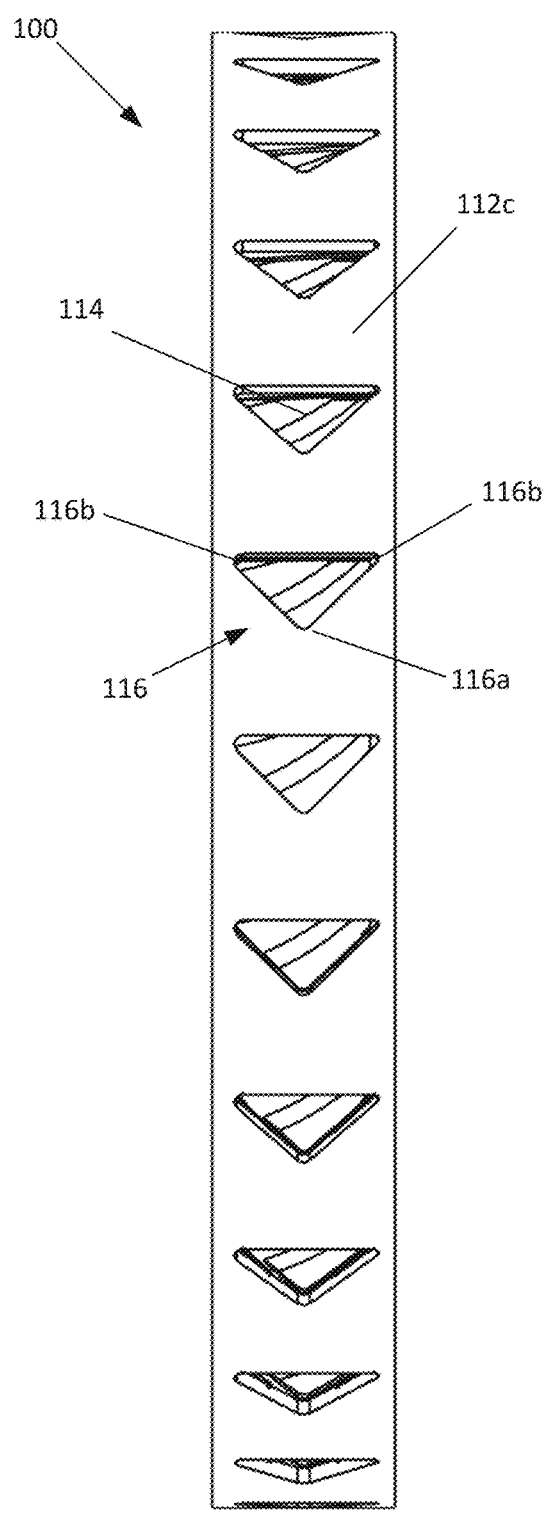
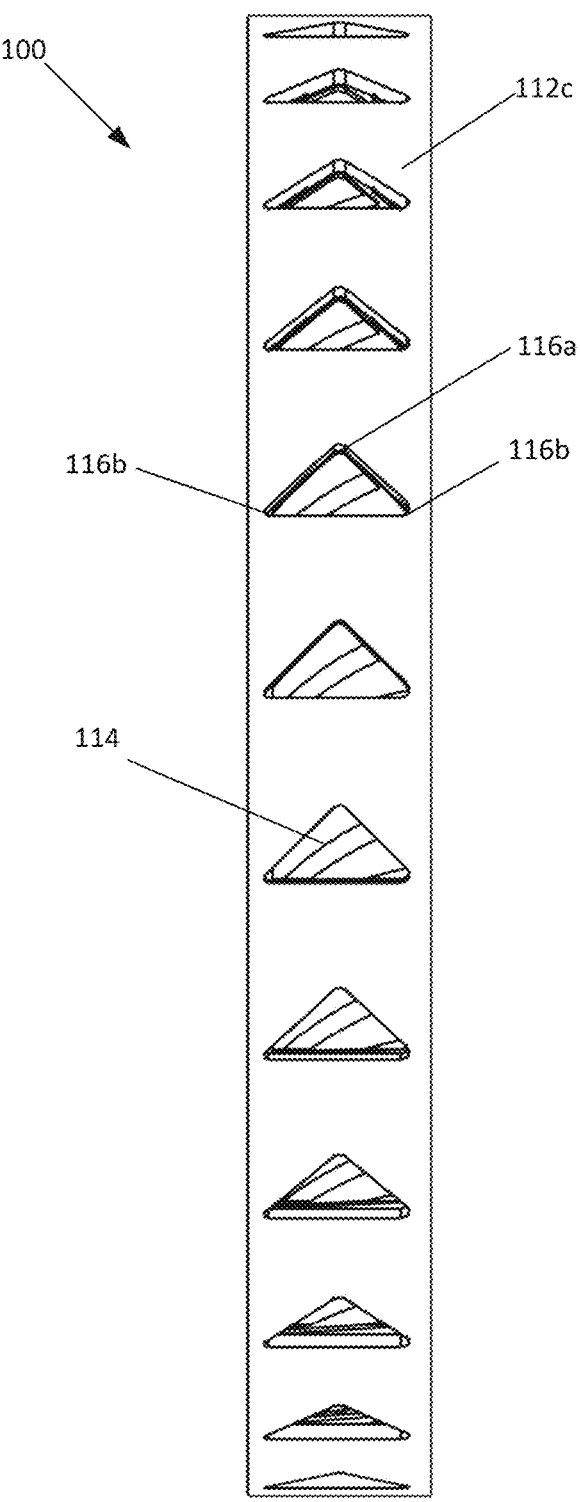

FIG. 10
FIG. 11
FIG. 12
FIG. 13
FIG. 14
FIG. 15
FIG. 16
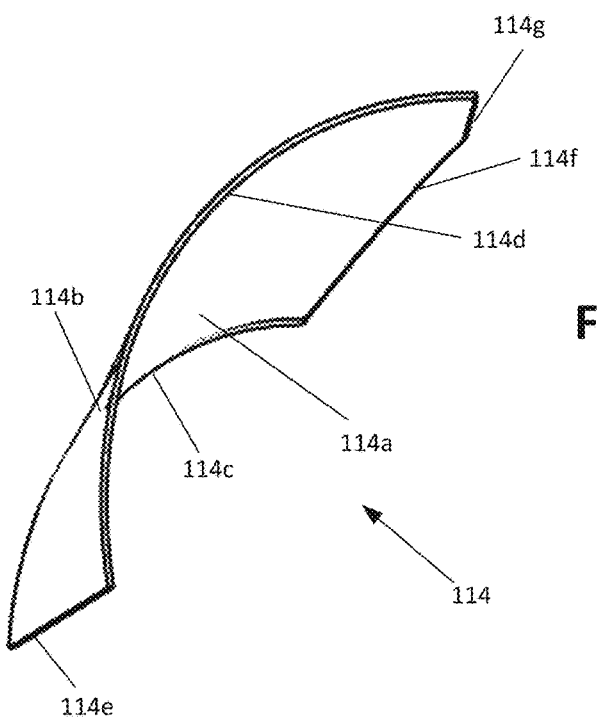
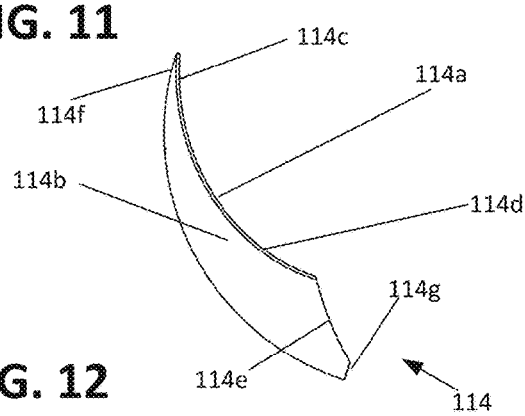
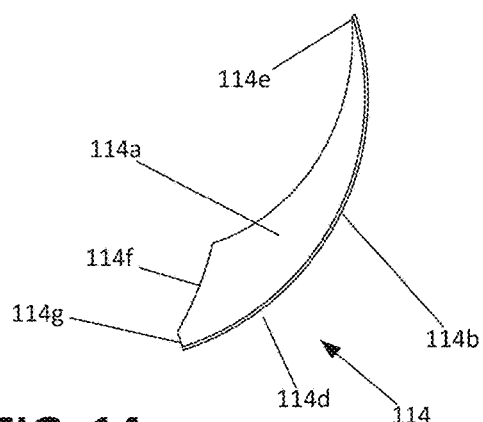
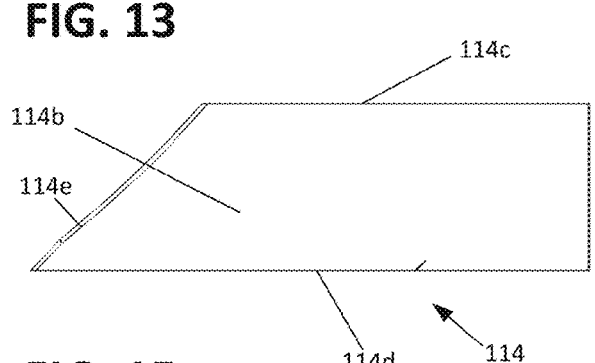
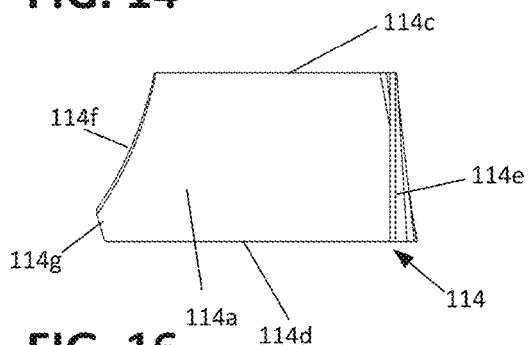
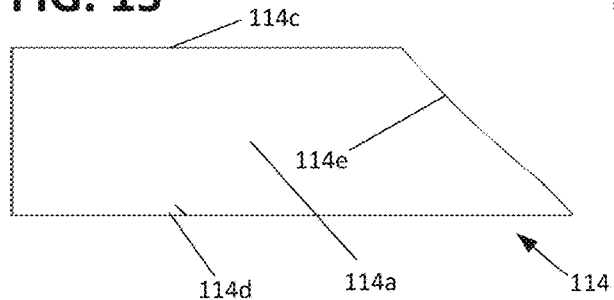
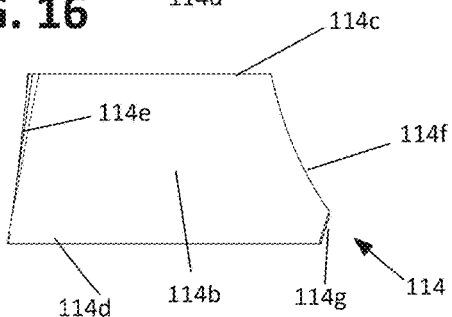

PRIOR ART

DYNAMIC SEAL ROTOR

RELATED APPLICATION

This application claims priority to U.S. Provisional Patent Application Ser. No. 62/955,187, filed on Dec. 30, 2019, the entirety of which is incorporated by reference herein.

BACKGROUND

Mechanical dynamic seals are used in many industries and can be comprised of two components. For example, a first component is known as a mating ring and referred to as a rotor while a second component is known as a seal and referred to as a stator. The contact between the two components generates heat, which in turn causes thermal deformation of the sealing interface of the rotor and stator. This thermal deformation is a source of performance variation. This variation can be limited by removing heat from the seal interface in a quick and efficient manner.

SUMMARY

A seal rotor for forming a seal between a rotating member and a stationary member of a machine is disclosed. The seal rotor can include a main body defining an inner circumferential wall proximate the rotating member, and including an outer circumferential wall spaced apart by an interstitial space, and can further include a plurality of fins and/or blades at least partially located within the interstitial space and extending between the inner and outer circumferential walls.

In some examples, the seal rotor is formed as a single unitary part.

In some examples, the seal rotor is an additively manufactured component.

In some examples, each of the plurality of fins is curved in at least one direction.

In some examples, each of the plurality of fins is curved in at least two directions.

In some examples, each of the plurality of fins is oriented at an oblique angle with respect to one or both of a longitudinal axis of the dynamic seal rotor and a transverse axis of the dynamic seal rotor.

In some examples, a plurality openings are provided and extend through the outer circumferential wall into the interstitial space.

In some examples, the plurality of openings are triangular in shape.

In some examples, the seal is formed from more than one material.

In some examples, a dissimilar material is used for the primary seal face, embedded into the primary seal interface, the fins, or some combination thereof.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 5 is a third side view of the hydrodynamic seal rotor of FIG. 1.

FIG. 6 is a fourth side view of the hydrodynamic seal rotor of FIG. 1.

FIG. 10 is a first perspective view of a single fin portion of the hydrodynamic seal rotor of FIG. 1.

FIG. 11 is a first side view of the fin portion shown in FIG. 10.

FIG. 12 is a second side view of the fin portion shown in FIG. 10.

FIG. 13 is a third side view of the fin portion shown in FIG. 10.

FIG. 14 is a fourth side view of the fin portion shown in FIG. 10.

FIG. 15 is a fifth side view of the fin portion shown in FIG. 10.

FIG. 16 is a sixth side view of the fin portion shown in FIG. 10.

DETAILED DESCRIPTION

Figure 1:
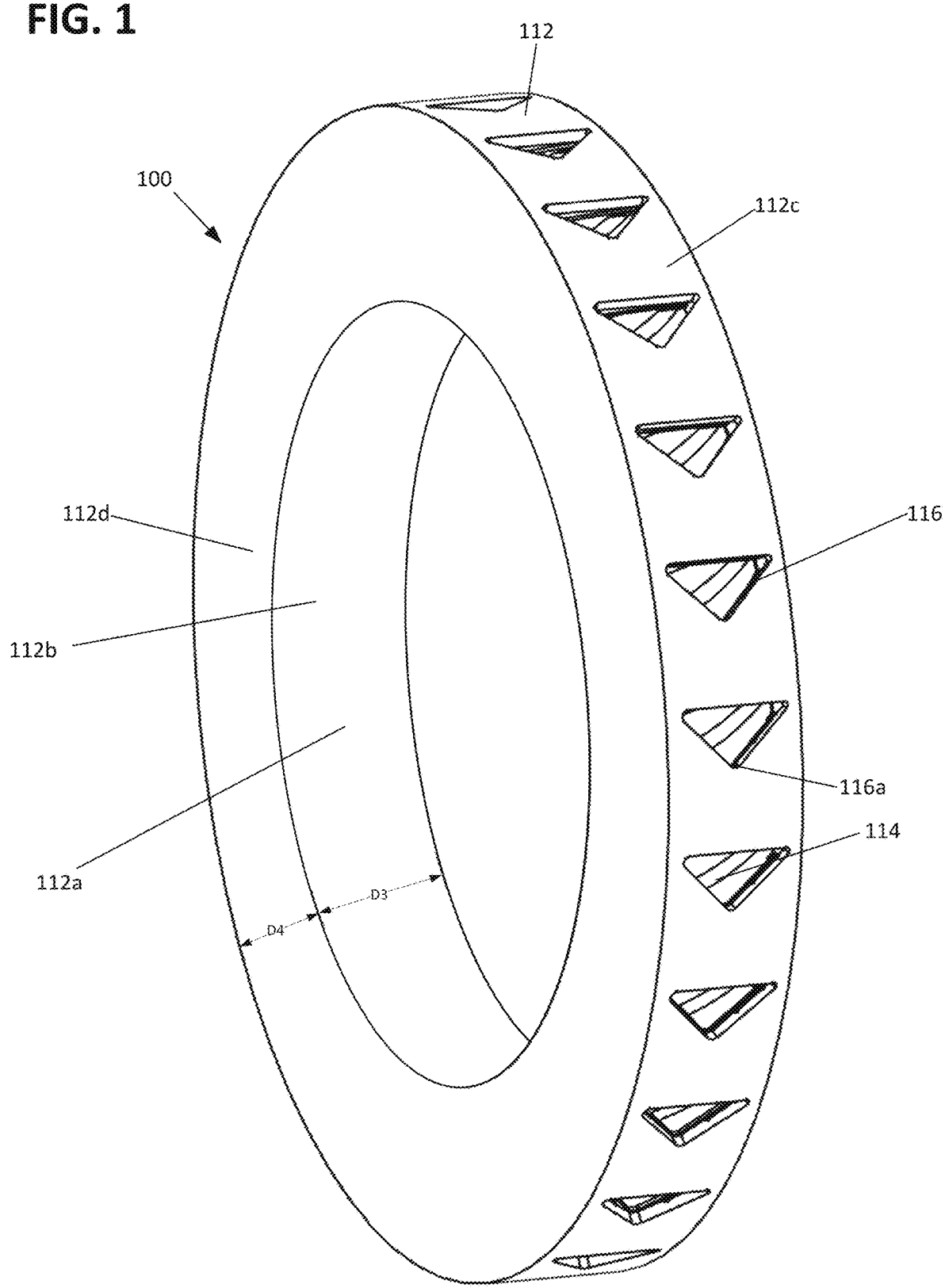
FIG. 1 is a perspective view of a first side of the hydrodynamic seal rotor of this disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Traditional dynamic seals typically have at least one primary interface, typically between a stationary member, such as a stator, and a rotating member, such as a rotor. Due to friction, heat is typically generated at this interface which tends to cause temperature gradients across components of the dynamic seal. As a result, dynamic seals can suffer from thermal distortion at the primary sealing interface, for example at the interface between the dynamic seal and rotor. Thermal distortion can cause deformation to the hardware that can adversely affect dynamic seal performance.

Figure 17:
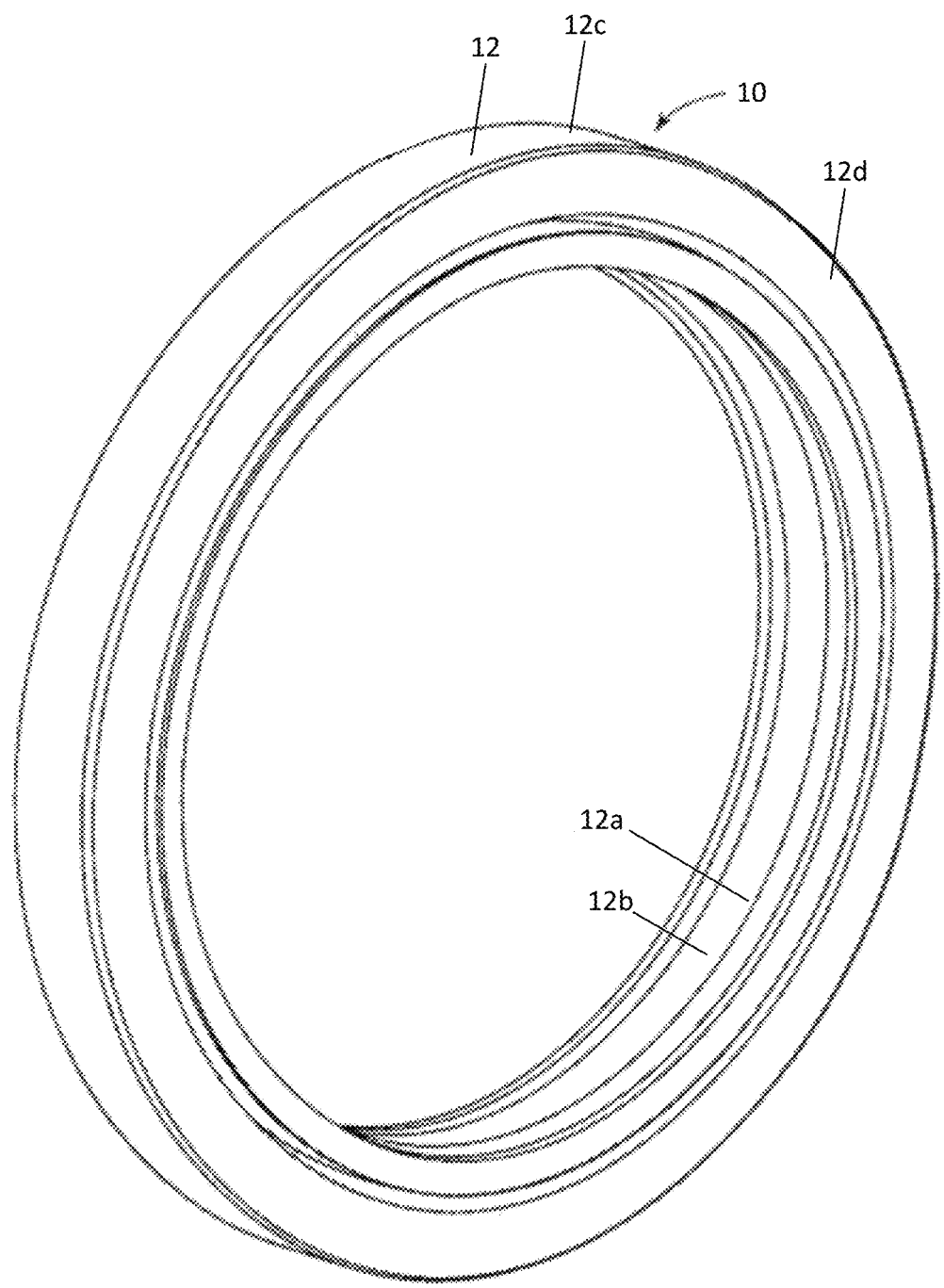
FIG. 17 is an isometric view of a prior art seal rotor.

Referring to FIG. 17, a prior art seal rotor 10 is shown in which the above-described thermal distortion condition can occur. As shown, the prior art seal rotor has a body 12 with an inner circumferential wall 12a, defining radial inner surface 12b, an outer circumferential wall 12c, and an end or face wall structure 12d joining the inner and outer circumferential walls 12a, 12c. With such a design a significant thermal gradient can form between the inner circumferential wall 12a and the outer circumferential wall 12b, thereby potentially resulting underperformance due to sealing interface deformation caused by thermal distortion. A seal rotor of the type shown at FIG. 17 is described in detail in U.S. Pat. No. 9,945,235, the entirety of which is incorporated by reference herein.

Figure 8:
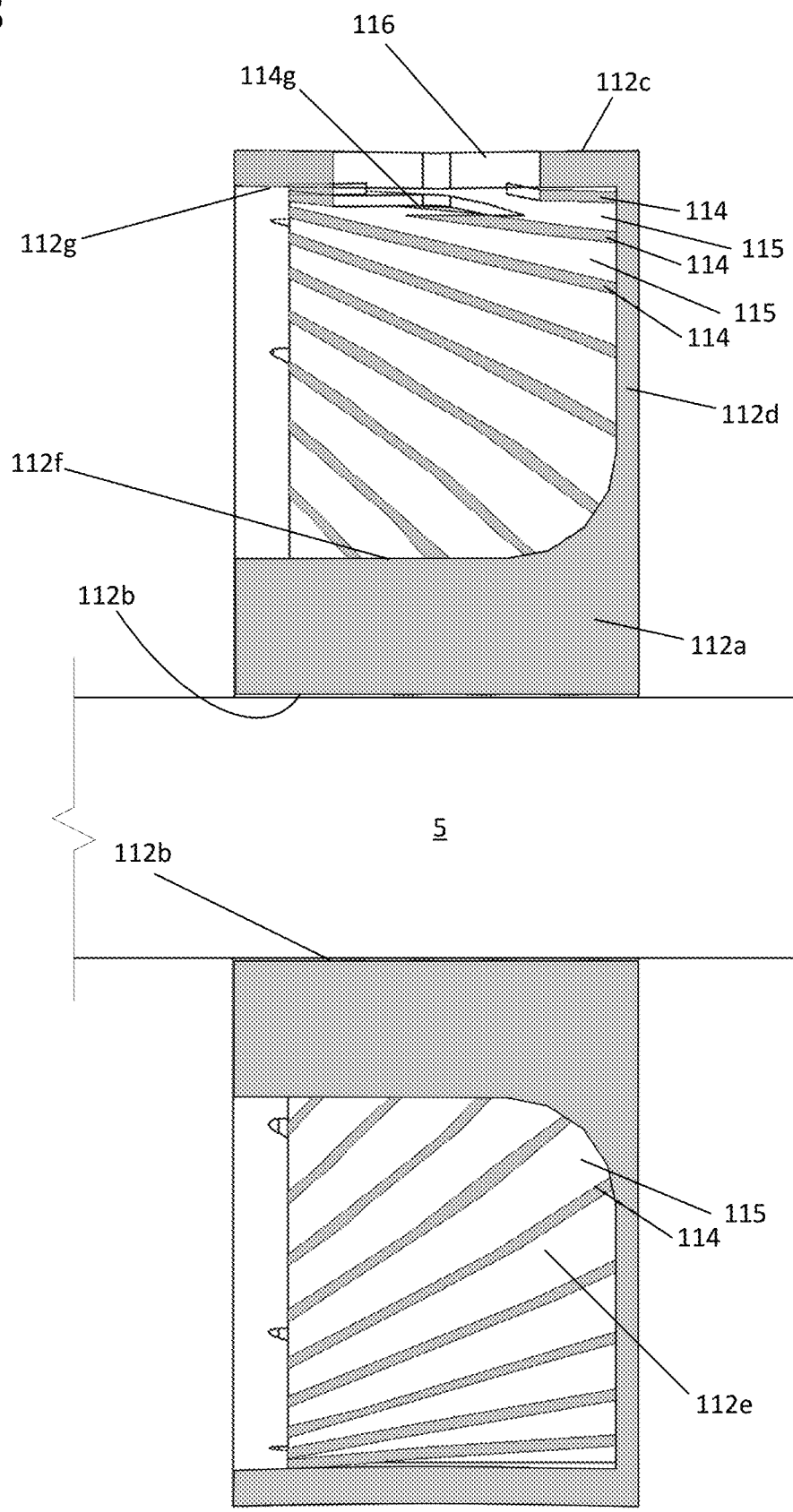
FIG. 8 is a cross-sectional view of the hydrodynamic seal rotor of FIG. 1, viewed from the fourth side view of the rotor, wherein in a shaft is shown passing through the rotor.
Figure 9:
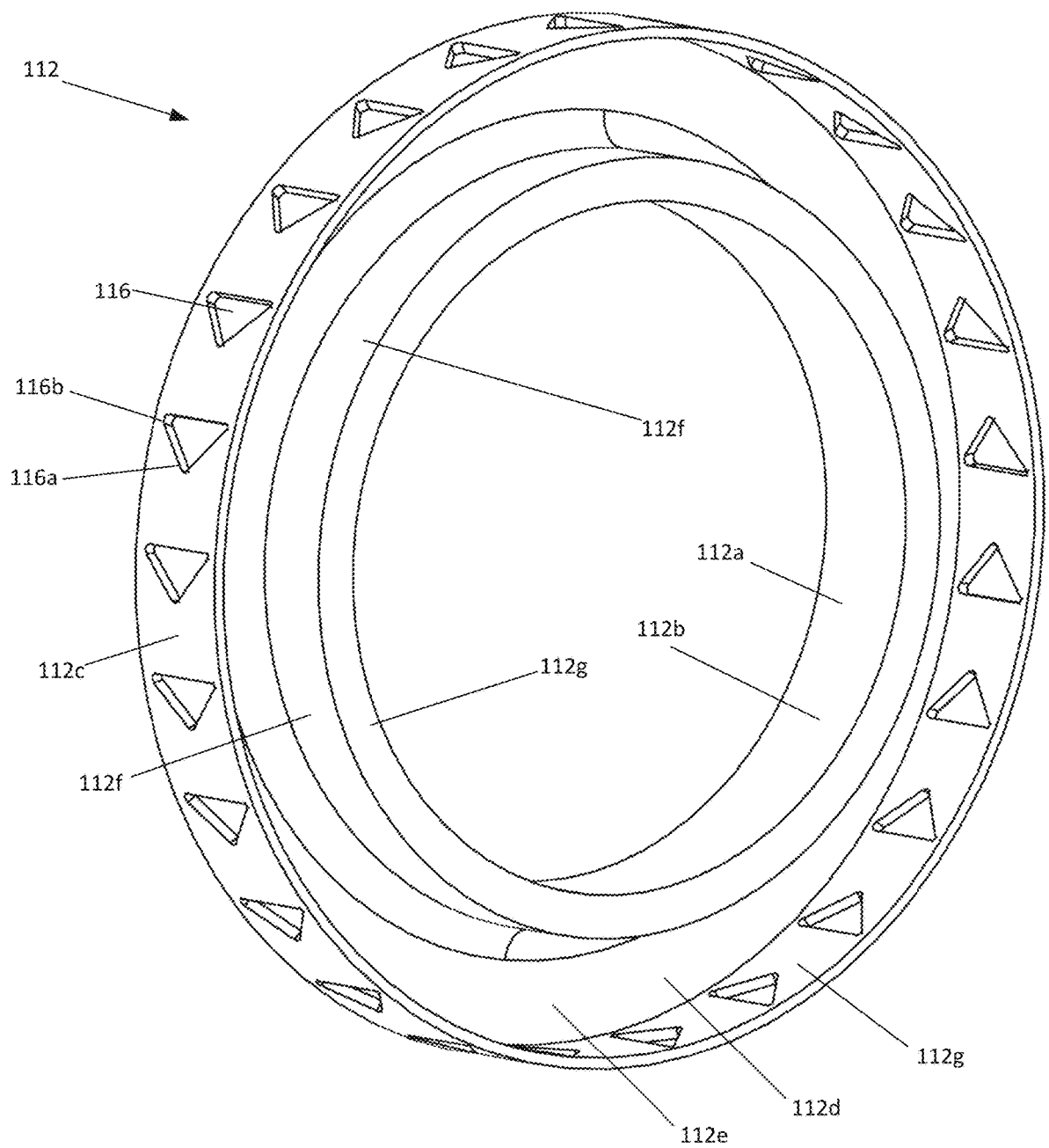
FIG. 9 is a perspective view of the hydrodynamic seal rotor of FIG. 1, with the internal fin portions of the rotor removed to show further details of the main body portion of the rotor.

Referring to FIGS. 1 to 8, a seal rotor 100 for sealing against a stationary member is disclosed which reduces the thermal distortion at the sealing interface and allows the components of the hydrodynamic seals to operate closer to an isothermal condition. FIG. 8 presents a cross-sectional view of the seal rotor 100 with a member 5 schematically shown passing through the central opening of the seal rotor 100. As shown, the seal rotor 100 has a main body 112 with an inner circumferential wall 112a, defining radial inner surface 112b, an outer circumferential wall 112c, and an end or face wall 112d joining the inner and outer circumferential walls 112a, 112c. In one aspect, the inner and outer circumferential walls 112a, 112c are separated by a distance D2 to define an interstitial space or gap 112e, as most easily viewed at FIG. 9 where the main body 112 is shown in isolation for clarity. The inner and outer circumferential walls 112a, 112c are also shown as having a height or depth D3 while the end wall 112d is shown as having a height D4. With reference to FIGS. 8 and 9, the main body 112 can be characterized as defining an open channel, wherein the gap 112e has a generally rectangular shape. In the example shown, the interior sides of the inner and outer circumferential walls 112a and 112c are parallel to each other. In the example shown, the gap 112e has a curved or radiused corner at the interior juncture of the inner and outer circumferential walls 112a, 112d. Other geometries of the gap 112e are possible. In one aspect, the main body 112 the radial exterior of the inner circumferential wall 112a defines an outer surface 112f while the radial interior of the outer circumferential wall 112c defines an inner surface 112g. In one aspect, the gap 112e extends between the surfaces 112f, 112g.

Figure 2:
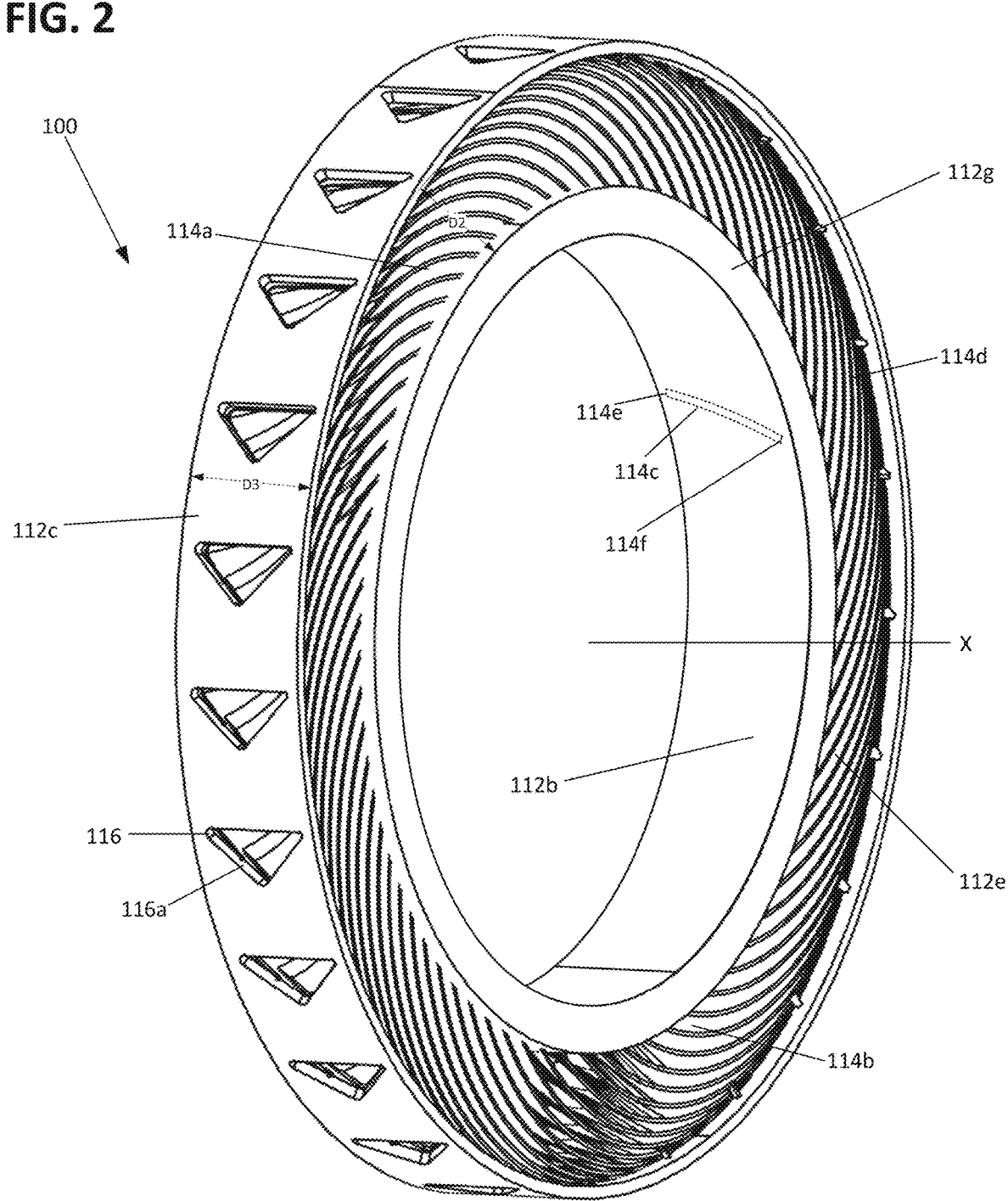
FIG. 2 is a perspective view of a second side of the hydrodynamic seal rotor of FIG. 1.
Figure 3:
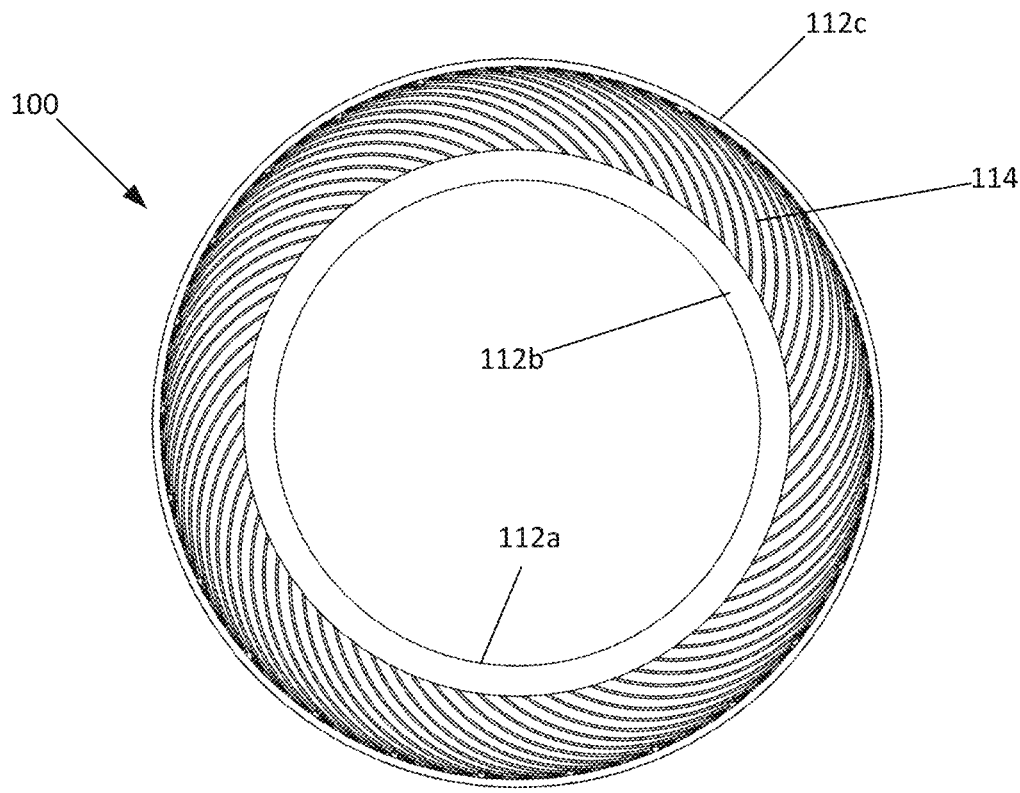
FIG. 3 is a first side view of the hydrodynamic seal rotor of FIG. 1.
Figure 4:
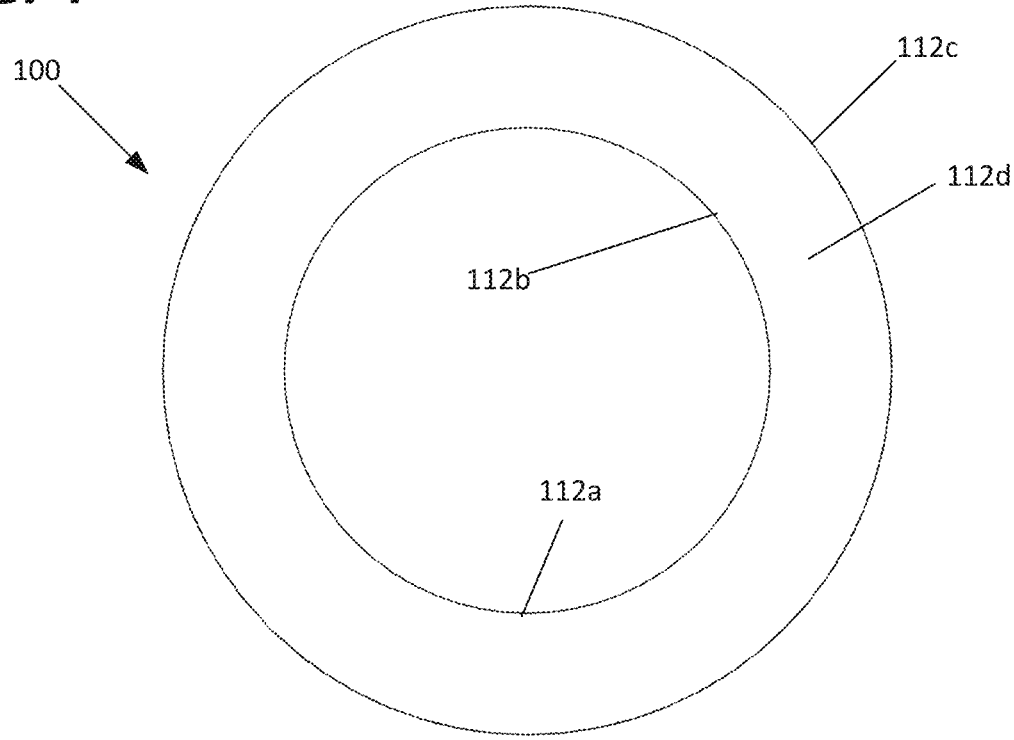
FIG. 4 is a second side view of the hydrodynamic seal rotor of FIG. 1.
Figure 7:
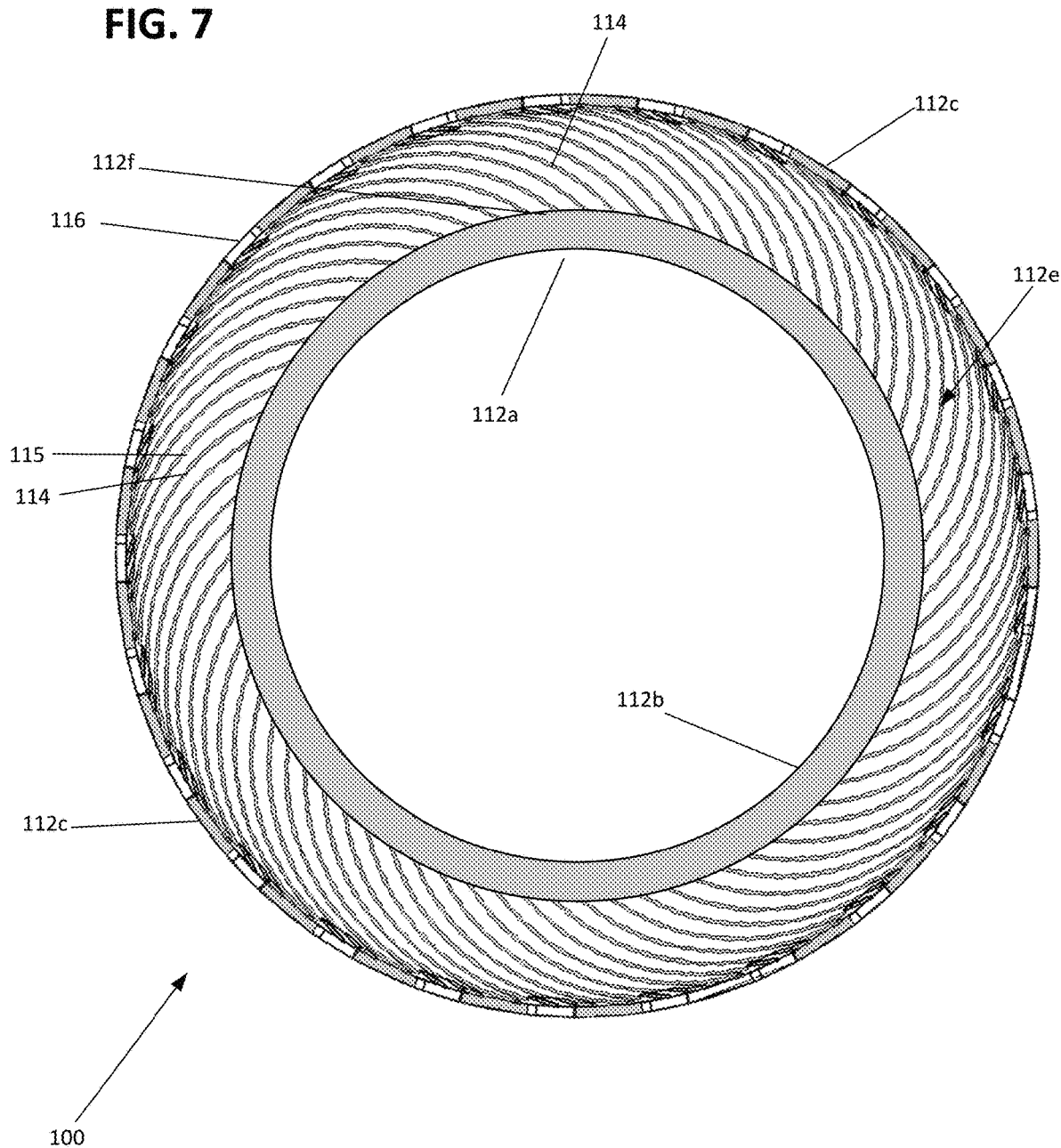
FIG. 7 is a cross-sectional view of the hydrodynamic seal rotor of FIG. 1, viewed from the first side view of the rotor.

In contrast to the example shown at FIGS. 1 and 2, the seal rotor 100 is further provided with internal fin geometries and flow passages to increase heat transfer away from the radial inner circumferential wall 112c. As most easily seen at FIG. 4, the seal rotor 100 is provided with a plurality of internal fins 114 disposed in the interstitial space or gap 112e and extending from the radial inner circumferential wall 112c to the radial outer circumferential wall 112d. More specifically, the fines 114 extend between the surfaces 112f and 112g. The internal fins 114 both conduct heat and promote fluid flow through the seal rotor 100. This allows for fluid conduct heat through the part and into the fluid. In the example shown, about 78 internal fins 114 are provided. More or fewer fins 114 can be provided, depending upon application. In the example shown, each internal fin 114 has opposite first and second surfaces 114a, 114b extending between a leading edge 114c and a trailing edge 114d and also extending between a first axial end 114e and a second axial end 114f. The ends 114f, 114e and the edge 114c are schematically depicted at FIG. 4. As configured, the internal fin leading edge 114c extends to the inner surface 112f and the internal fin trailing edge 114d extends to the radially outward circumferential wall 112c. As configured, the internal fin first axial end 114e extends to the end wall 112d while the internal fin second axial end 114f is exposed within the interstitial space or gap 112e.

In the example shown, the internal fins 114 are positioned at an oblique angle to the radial inner and outer circumferential walls 112c, 112d, to an axial or longitudinal axis X, and to a transverse axis Y of the main body 112. Such a configuration allows for the length of the internal fins 114 to be longer in comparison to a fin extending orthogonally between the walls 112c, 112d. Accordingly, the disclosed configuration results in the area of the inner and outer circumferential walls 112a, 112c to be increased, thereby increasing the ability of each internal fin 114 to direct airflow within the interstitial space or gap 112e and to dissipate heat away from the radial inner circumferential wall 112a. The surfaces 114a, 114b may also be curved between the leading and trailing edges 114c, 114d and/or between the first and second axial ends 114e, 114f to enhance airflow and/or thermal dissipation characteristics. In some examples, the internal fins 114 are parallel to the longitudinal axis X and/or orthogonal to the transverse axis.

In one aspect, the seal rotor 100 further includes a plurality of fluid inlets 116 extending through the radial outer circumferential wall 112d. The inlets 116 allow for fluid flow, for example gas flow, to enter the seal rotor 100 between the fins 114 such that convective heat transfer effectiveness is increased. In the example shown, the fluid inlets 116 are provided with a triangular shape with a central point 116a pointed in the same direction as the fins 114 extend from the edge 114c towards the edge 114d. In some examples, the triangular shape includes side points 116b. In some examples, the side points 116b can extend past the edges 114c, 114 of the fins 114 towards the outer circumferential wall 112d. Although the fluid inlets 116 are shown as having a triangular shape, other opening shapes are possible without departing from the concepts presented herein. The fluid inlets 116 enable fluid to pass through the radial outer circumferential wall 112d and into the gap 112e whereby the fluid can then be introduced to the fins 114. As fluid enters the interstitial spaces 115 between the fins 114, convective heat transfer occurs to remove heat from the fins 114. In the example presented, it is noted that some of the fins 114 are provided with cutout portions or notches 114g proximate the inlets 116 such that air passing through an individual inlet 116 can flow into multiple interstitial spaces 115 between multiple fins 114, as most clearly illustrated at FIG. 8. After passing across the fins 114, the relatively heated fluid can then exit through the open end of the gap 112e of the seal rotor 100 proximate the second axial ends 114f of the fins 114. In some examples, the fluid flow can be the reverse as described above, with fluid flowing into the interstitial space between the fins 114 at the fin second axial ends 114f and then out of the inlets 116, which would then be characterized as outlets 116 or more generically as ports or openings 116. As the fins 114 are in direct contact with the inner circumferential wall 112a of the main body 112, the fins 114 act as a heat sink for the inner circumferential wall 112a, thus reducing thermal distortion across the seal rotor 100. As the fins 114 are also in direct contact with the outer circumferential wall 112c and the end wall 112d, all of the components of the seal rotor 100 are in thermal communication with each other. As such, with the disclosed configuration, the components of the seal rotor 100 can operate closer to an isothermal condition during operation.

As can be appreciated in the disclosure, the seal rotor 100 has a complex shape with numerous detailed internal and external features. For example, the fins 114 are located in very close proximity to each other and have ends that are overlapping with the inlets 116. Due to features of this kind, the seal rotor 100 can be advantageously formed through an additive manufacturing process, wherein material is deposited in layers to form the complex internal and external shapes of the seal rotor 100. In the example shown, the seal rotor 100 is an additively manufactured and formed as a single unitary part.

Figure 8A:
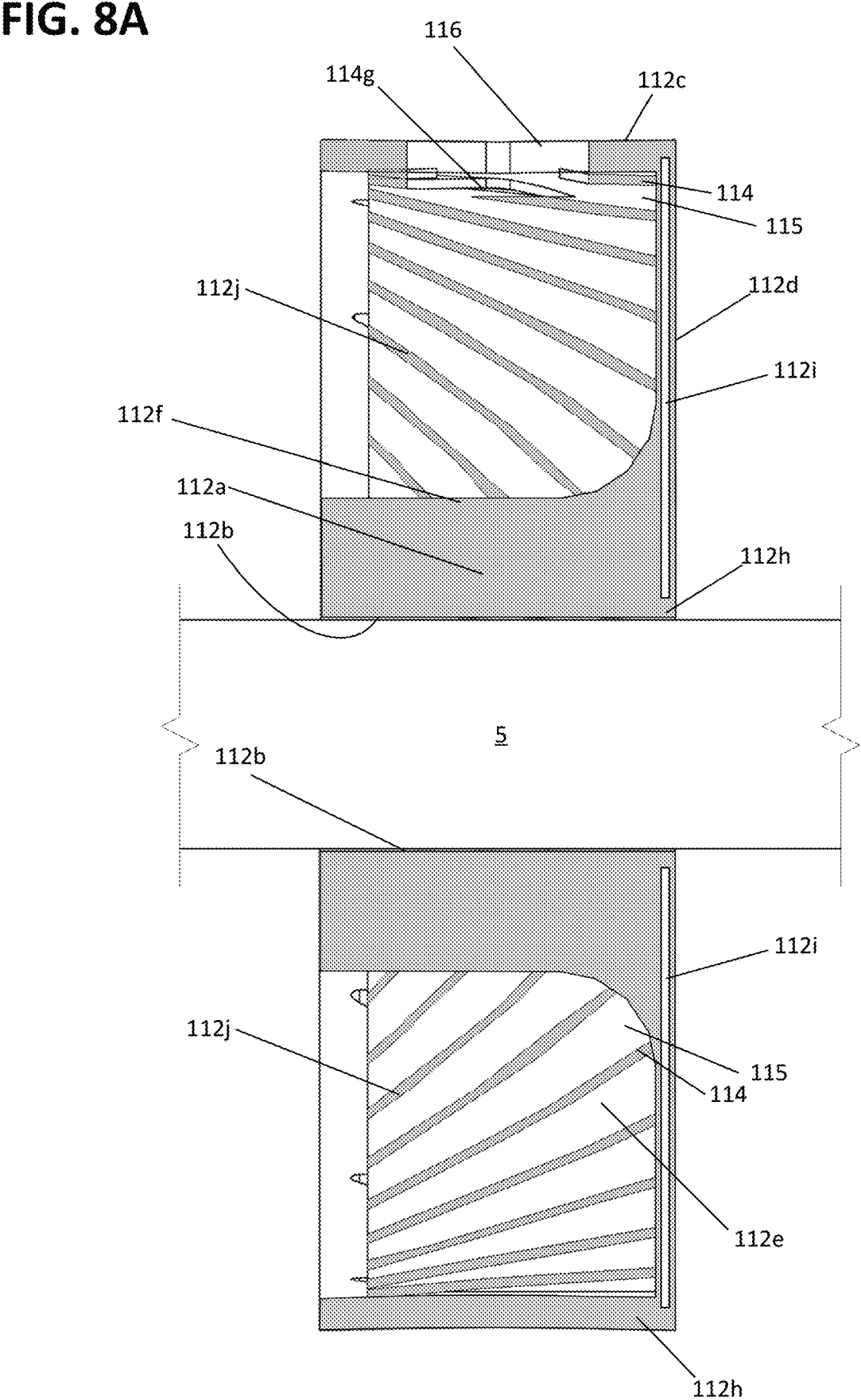
FIG. 8A is the cross-sectional view of FIG. 8, the hydrodynamic seal is shown as including a second embedded material with the main body portion.

In some examples, the seal rotor 100 is formed such that the main body 112 and fins 114 are formed as a single, integrally formed component. In some examples, the seal rotor 100 is formed from a single material. One example material is a metal material, such as steel, copper, aluminum, and related alloys. Another example material is carbon material. In some examples, the seal rotor 100 is formed from multiple materials. For example, a first material could be used to define the all or part of the seal rotor 100 while a second material is used to form the remainder of the seal rotor 100. In some examples, a second material is embedded into a first material. In some examples, the second material 112$i$ has a higher thermal conductivity in comparison to that of the first material 112$h$. Such an example is shown at FIG. 8A, wherein the seal rotor 100 is formed from a first material 112$h$ with a second material 112$i$ being entirely embedded within the second material. In the example shown at FIG. 8A, the second material 112$h$ is formed as an annular disk. However, other shapes and distributions, contiguous and non-contiguous, are possible. In the example shown, the first material 112$h$ is formed from steel while the second material is a different metal material, such as a copper or aluminum alloy. In one aspect, a harder material, such as steel, is ideal for defining the radial inner face 112$b$ which interfaces with the shaft 5. However, the thermal performance of the seal rotor 100 would be improved by using a material with a higher thermal conductivity. As such, by embedding a second material 112$i$ within the first material 112$h$ a composite structure results with a higher net thermal conductivity for improved thermal performance without compromising the durability provided by the first material 112$h$. In some examples, the fins 114 can be also be formed from a different material, such as a third material 112$j$. In some examples, the third material 112$j$ is the same material as the second material 112$i$ while the remainder of the seal rotor 110 is formed from the first material 112$h$. In some examples, the first, second, and third materials 112$h$, 112$i$, 112$j$ are all different from each other such that seal rotor 110 is formed from three different materials.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

I claim:

1. A seal rotor for sealing against a non-rotating member, the seal rotor comprising:
   a) a main body defining an inner circumferential wall and outer circumferential wall spaced apart by an interstitial space;
   b) a plurality of fins at least partially located within the interstitial space and extending between the inner and outer circumferential walls; and
   c) a plurality of openings extending through the outer circumferential wall into the interstitial space and arranged such that air passing through one of the plurality of openings can flow into multiple fin interstitial spaces defined between the plurality of fins.

2. The seal rotor of claim 1, wherein the seal rotor is formed as a single unitary part.

3. The seal rotor of claim 2, wherein the seal rotor is an additively manufactured component.

4. The seal rotor of claim 1, wherein each of the plurality of fins is curved in at least one direction.

5. The seal rotor of claim 4, wherein each of the plurality of fins is curved in at least two directions.

6. The seal rotor of claim 1, wherein each of the plurality of fins is oriented at an oblique angle with respect to one or both of a longitudinal axis of the seal rotor and a transverse axis of the seal rotor.

7. The seal rotor of claim 1, wherein the plurality of openings are triangular in shape.

8. The seal rotor of claim 2, wherein the seal rotor is formed from a single material.

9. The seal rotor of claim 1, wherein the seal rotor is formed from more than one material.

10. A machine comprising:
    a) a rotating member;
    b) a stationary member; and
    c) a seal rotor providing a seal between the rotating and stationary members, the seal rotor including:
       i) a main body defining an inner circumferential wall proximate the rotating member, and including an outer circumferential wall spaced apart by an interstitial space;
       ii) a plurality of fins at least partially located within the interstitial space and extending between the inner and outer circumferential walls; and
       iii) a plurality of openings extending through the outer circumferential wall into the interstitial space and arranged such that air passing through one of the plurality of openings can flow into multiple fin interstitial spaces defined between the plurality of fins.

11. The machine of claim 10, wherein the seal rotor is formed as a single unitary part.

12. The machine of claim 10, wherein the seal rotor is an additively manufactured component.

13. The machine of claim 10, wherein each of the plurality of fins is curved in at least one direction.

14. The machine of claim 13, wherein each of the plurality of fins is curved in at least two directions.

15. The machine of claim 10, wherein each of the plurality of fins is oriented at an oblique angle with respect to one or both of a longitudinal axis of the seal rotor and a transverse axis of the seal rotor.

16. The machine of claim 10, wherein the plurality of openings are triangular in shape.

17. The seal rotor of claim 10, wherein the seal rotor is formed from a single material.

18. The seal rotor of claim 10, wherein the seal rotor is formed from more than one material.

* * * * *